United States Patent [19]
Perlman

[11] Patent Number: 4,961,108
[45] Date of Patent: Oct. 2, 1990

[54] CIRCUITRY FOR COMB FILTERING PAL AND NTSC VIDEO SIGNALS

[75] Inventor: Stuart S. Perlman, Princeton, N.J.

[73] Assignee: RCA Licensing Corporation, Princeton, N.J.

[21] Appl. No.: 261,522

[22] Filed: Oct. 24, 1988

[51] Int. Cl.[5] .............................................. H04N 9/78
[52] U.S. Cl. ..................................... 358/31; 358/40; 358/329
[58] Field of Search ................ 358/31, 40, 329, 21 R, 358/37

[56] References Cited

U.S. PATENT DOCUMENTS

| | | | |
|---|---|---|---|
| 4,480,265 | 10/1984 | Spiero | 358/31 |
| 4,506,286 | 3/1985 | Kashigi | 358/13 |
| 4,688,080 | 8/1987 | Wagner | 358/31 |
| 4,706,113 | 11/1987 | Ito et al. | 358/37 |
| 4,727,415 | 2/1988 | Nakagawa et al. | 358/31 |
| 4,786,963 | 11/1988 | McNeely | 358/31 |
| 4,803,547 | 2/1989 | Stratton | 358/31 |

FOREIGN PATENT DOCUMENTS

3007520A1  9/1981  Fed. Rep. of Germany.

OTHER PUBLICATIONS

Y. Nakajima et al., "Improvement of Picture Quality for NTSC and PAL Systems by Digital Signal Processing", IEEE Trans. Consumer Electronics, vol. CE-31, No. 4, Nov. 1988, pp. 642-654.

Primary Examiner—Tommy P. Chin
Attorney, Agent, or Firm—Joseph S. Tripoli; Eric P. Herrmann; James B. Hayes

[57] ABSTRACT

Comb filter apparatus for comb filtering NTSC or PAL video signals includes sampling circuitry to sample the video signal at 45 degrees relative to the I,Q or U,V axes. The sampled signal is coupled to delay circuitry arranged to concurrently provide video samples from three successive horizontal lines, designated top, middle and bottom. The video samples from the middle line are combined with samples alternately selected from the top and bottom lines to provide a comb filtered signal.

11 Claims, 6 Drawing Sheets

| line | | | | | | |
|---|---|---|---|---|---|---|
| N−2 | +Q | −I | −Q | +I | +Q | −I |
| N−1 | −Q | +I | +Q | −I | −Q | +I |
| N   | +Q | −I | −Q | +I | +Q | −I |
| N+1 | −Q | +I | +Q | −I | −Q | +I |
| N+2 | +Q | −I | −Q | +I | +Q | −I | line

| | | | | | | |
|---|---|---|---|---|---|---|
| N−2 | −U | −V | U | V | −U | −V |
| N−1 | V | U | −V | −U | V | U |
| N | U | V | −U | −V | U | V |
| N+1 | −V | −U | V | U | −V | −U |
| N+2 | −U | −V | U | V | −U | −V | line

| | | | | | |
|---|---|---|---|---|---|
| N−2 | −(V+U) | −(V−U) | (V+U) | (V−U) | −(V+U) |
|     | a      | b      | c     | d     | e      |
| N−1 | (V+U)  | −(V−U) | −(V+U)| (V−U) | (V+U)  |
|     | l      | ↑m     | n     | ↑o    | p      |
| N   | (V+U)  | (V−U)  | −(V+U)| −(V−U)| (V+U)  |
|     | ↓s     | t      | ↓u    | v     | ↓w     |
| N+1 | −(V+U) | (V−U)  | (V+U) | −(V−U)| −(V+U) |
| N+2 | −(V+U) | −(V−U) | (V+U) | (V−U) | −(V+U) | time →

4,961,108

CIRCUITRY FOR COMB FILTERING PAL AND NTSC VIDEO SIGNALS

This invention is related to comb filters for processing video signals.

BACKGROUND OF THE INVENTION

In processing video signals, it is known to be particularly advantageous to separate the luminance and chrominance components from composite video signal with comb filters. The reason being that the separated luminance component is of full bandwidth, e.g., 4.2 MHz for NTSC signal, and cross components are substantially eliminated from both of the separated luminance and chrominance components. Typical intraframe comb filters for NTSC video signals include circuitry for combining signals which are displaced in time by an odd integral number of horizontal line periods. Because the phase of the chrominance subcarrier changes by exactly 180° from line to line, additively combining NTSC video signals displaced by one line interval produces a signal in which the luminance components from the two lines constructively combine and the chrominance component is cancelled. Conversely, if the signals are subtractively combined the luminance component is cancelled while the chrominance components from the two lines constructively combine. The vertical resolution of the luminance component is compromised but is acceptible.

PAL signals on the otherhand have a chrominance subcarrier which exhibits a 180° phase change every two horizontal line periods. Therefore, typical intraframe PAL comb filters combine video signals which are displaced in time by two horizontal intervals. The PAL comb filter function is basically the same as for the NTSC comb filter however, since the signals that are combined are spatially displaced by two lines, the vertical resolution of the PAL luminance component is significantly impaired, and tends towards not being acceptable.

Yoshimitsu Nakajima et al in an article entitled "Improvement of Picture Quality For NTSC And PAL Systems By Digital Signal Processing," IEEE Transactions on Consumer Electronics, Vol. CE-31, No. 4, November, 1985, pp. 642–654 describe adaptive comb filters which combine samples from three successive lines of video signal. In this system, the NTSC embodiment combines samples which are vertically aligned, similar to the aforedescribed typical NTSC and PAL comb filters. The PAL embodiment however combines diagonally aligned samples from adjacent lines. This tends to preserve the vertical resolution of the luminance component, reduces memory requirements for delaying the video signals but tends to have an adverse affect on images containing vertical lines.

Published West German Application No. DE 3007520 A1 shows a comb filter apparatus for PAL signals including an intraframe comb filter. The intraframe comb filter includes a one line delay element for delaying alternate samples of the video signal from successive lines of signal. The delayed samples are coupled to one input of a combining circuit and intervening samples from the current line are coupled to a second input of the combining circuit. Since the combined signals correspond to alternate samples on alternate lines, the intraframe filter function corresponds to a diagonal rather than a vertical comb filter. Further since the apparatus operates on alternate samples, there is a loss in horizontal resolution.

Richard C. Spiero in U.S. Pat. No. 4,480,265 describes a circuit for comb filtering separated PAL chrominance signals by combining signals from adjacent video lines. In this system one of the signals to be combined is first applied to a phase inverter which inverts the phase of the (R−Y) component of the chrominance signal before combining. The line of chrominance which undergoes phase inversion has its components phase aligned with the chrominance components of adjacent lines. The phase inverted line and an adjacent line is additively combined to develope a noise reduced chrominance signal. This system is limited to comb filtering chrominance signal and cannot be utilized to separate the luminance and chrominance components from composite PAL video signals.

It is an object of the present invention to provide a comb filter for processing at least PAL video signals, without any of the aforementioned shortcomings.

SUMMARY OF THE INVENTION

The present invention is a comb filter for video signals, including a delay element for concurrently providing video signal from three successive lines designated Top, Middle and Bottom, and signal combining circuitry for combining signal from the Middle line with signal alternately selected from the Top and Bottom lines, along each line interval.

In a further embodiment of the invention, detection circuitry is coupled to receive the signals from the Top, Middle and Bottom lines, and generate a control signal if the signal from the combining circuitry potentially includes undesirable artifacts. Substitution circuitry responsive to the control signal, is included to replace the signal from the combining circuitry with alternatively filtered signal from at least one of the Top, Middle and Bottom lines of signal.

DETAILED DESCRIPTION

The invention may be practiced in either the analog, e.g., sampled data, or digital signal processing domain, however, it will be described in a digital signal processing environment. As such, except for clock lines and the analog signal input, the interconnecting lines are assumed to be multibit parallel connections.

Figures 1A, 1B, 1C:
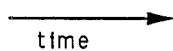
FIGS. 1A, 1B and 1C are pictoral diagrams representing a portion of a field of chrominance components of video signals sampled at four times the chrominance subcarrier frequency, which diagrams are useful in understanding the principle of the invention.

Referring to FIG. 1A, a matrix of signal samples are illustrated which are intended to represent successive chrominance components from portions of successive lines of an NTSC video signal sampled at four times the color subcarrier frequency. The signal is presumed to be sampled in phase with one of the axes of the quadrature modulated color difference signal components. Samples designated ±I represent the in phase component and samples designated ±Q represent the quadrature phase component. The ± signs represent the sampling phase relative to the subcarrier and not necessarily the sample polarity. If the sampled video signal is a composite video signal, the samples at each location will include a luminance, Y contribution, e.g., Y+Q, Y−I, Y−Q, Y+I, Y+Q etc. however, the Y terms have been excluded in the drawing to avoid confusion. In FIG. 1A, the in phase and quadrature samples I,Q may represent the (R−Y) and (B−Y) color difference signals or the conventional I and Q color difference signals. The particular sample set is determined by the sampling phase. It is seen from FIG. 1A that vertically adjacent samples represent like chrominance components. This vertical alignment facilitates comb filtering, i.e., additively combining vertically adjacent samples cancels the chrominance and provides twice luminance while subtractive combining vertically adjacent samples cancels luminance contributions and provides twice chrominance (assuming substantially redundant line-to-line image content). Any line may be combined with either adjacent line to produce a comb filter signal.

FIG. 1B illustrates a matrix of signal samples which are intended to represent successive chrominance components from portions of successive lines of a PAL video signal (e.g., PAL/M) sampled at four times the subcarrier frequency. As in FIG. 1A contributions of the luminance component (for composite signal) have been excluded. The signal is presumed to be sampled in phase with one of the axes of the quadrature modulated color difference signal components U,V. By convention component U represents the (B−Y) color difference signal and component V represents the (R−Y) color difference signal. In the PAL signal the phase of the V component is shifted 90° line-to-line relative to the U component. The result is that vertically adjacent samples represent alternate components. Consequently vertically adjacent samples cannot be combined to produce comb filtered signals representing a particular component. Note however that the samples may be combined diagonally, as indicated by the arrows, to develope comb filtered components. However, errors will occur for horizontal transitions which can occur in the luminance component, resulting in significant cross components in the comb filtered chrominance components.

FIG. 1C shows the sample destribution resulting from sampling the video signal at 45 degrees off the U or V axes. As in FIGS. 1A and 1B the luminance contributions, if present in the input video signal, have been excluded from the diagram. It is seen from FIG. 1C that vertically adjacent samples represent like chrominance components. Alternate samples between any pair of lines represent samples of opposite subcarrier phase and may be combined to separate the luminance and chrominance components of composite video signal. The pairs of samples which may be combined for this purpose are indicated by the arrows in the figure. To produce separated luminance and chrominance components representing line N of the video signal, the samples along line N are alternately combined with vertically adjacent samples from line N+1 and line N−1, i.e., sample (l,s) (m,b) (n,u) (o,d) and (p,w). Similarly, to produce separated components representing line N−1, the samples along line N−1 are alternately combined with samples from line N−2 and line N.

Alternatively, if the input video signal contains only a chrominance component, alternate samples of like subcarrier phase may be additively combined to produce noise reduced comb filtered chrominance signals, i.e., samples (l,a) (m,t) (n,c) (o,n) and (p,e). In this example it is necessary to concurrently provide samples from three adjacent lines. Comb filtered chrominance samples may be produced from signals from only two adjacent lines if alternate samples from one of the lines have their polarity reversed. In this instance, consider developing comb filtered chrominance samples representing line N by combining samples from lines N and N+1. In line N+1 samples s,u and w are inverted to produce samples −,s −u and −w. Then samples (1,−s) (m,t) (n,−u) (o,v) and (p−w) are combined to produce the comb filtered chrominance component.

Figure 2:
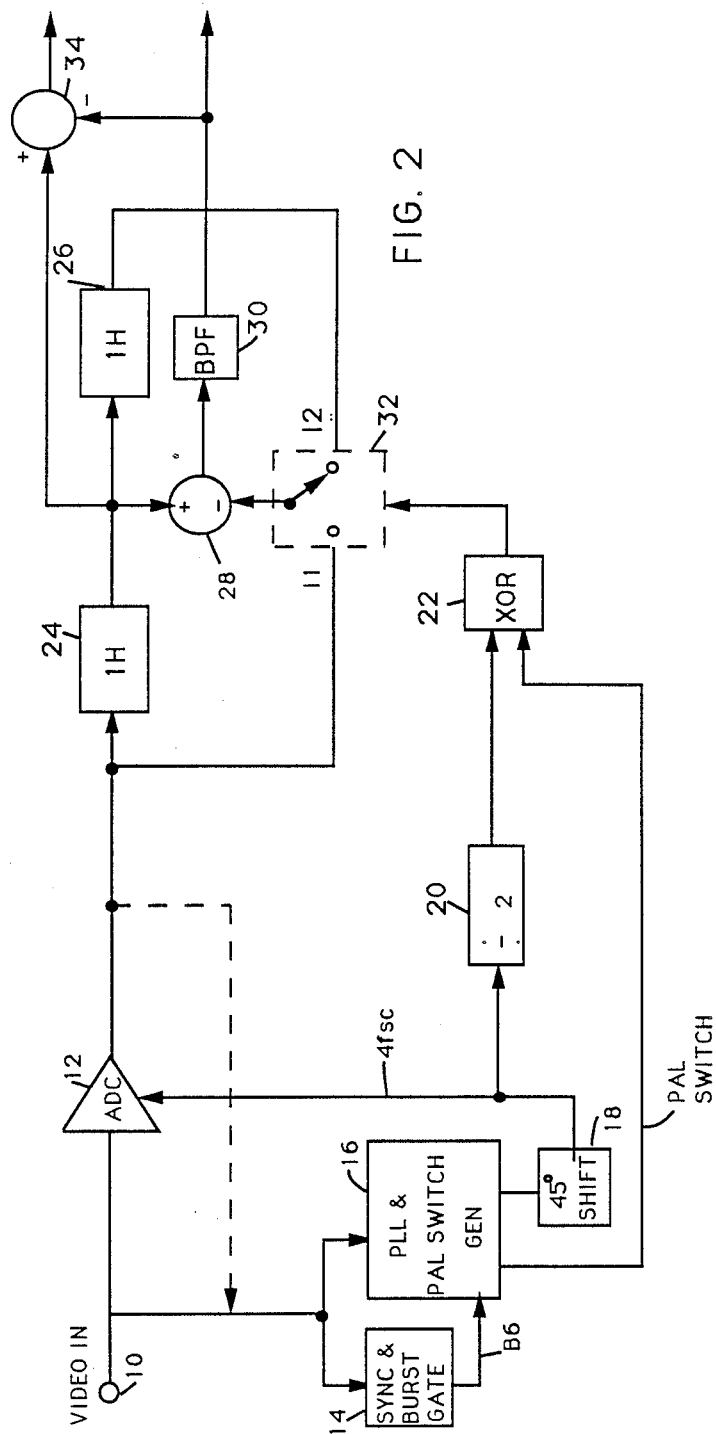
FIGS. 2, 3 and 9 are block diagrams of alternative comb filter circuits embodying the invention.

FIG. 2 illustrates circuitry embodying the basic invention. Input video signal which may be sourced from a conventional television tuner is applied to terminal 10. This signal is coupled to the analog input connection of an analog-to-digital converter (ADC) 12, and to the phase-locked-loop (PLL) circuitry 16 and sync separator 14. The sync separator developes a burst gate signal BG which is coupled to the PLL circuitry 16. PLL circuitry 16 is responsive to the burst component of the video signal to develope a clock signal having a frequency of four times the chrominance subcarrier frequency $f_{sc}$, phase locked to e.g. the U axis of the chrominance component. This clock signal is coupled to a phase shifter 18, which shifts the phase of the clock signal to substantially 45° relative to the U or V axis. The phase shifted clock signal is applied to the sampling clock input terminal of ADC 12 and a divide-by-two frequency divider 20. The PLL 16 also developes a PAL switch signal which represents the relative phase of the V chrominance component. Circuits 14, 16 and 18 may be of conventional design. Circuit 18 may be incorporated in the PLL 16. In an alternative arrangement, the sync separator 14 and PLL 16 may be designed to process digital samples in which case the input signal to these circuits is derived from the output signal from ADC 12 (indicated by the broken line connection).

The PAL switch signal and the clock signal from divider 20 are coupled to respective input terminals of an exclusive OR circuit 22 which produces a two times $f_{sc}$ clock signal of opposite phase on alternate lines. The two times $f_{sc}$ clock signal is coupled to the control input terminal of a switch circuit 32, to alternately couple samples applied to its two signal inputs I1 and I2 to the subtracter 28.

The video signal at terminal 10 is sampled and converted to binary from by ADC 12 to produce samples as illustrated in FIG. 1C. These samples are coupled to a one horizontal interval delay element 24 and to the input terminal I1 of switch 32. The delayed signal from delay element 24 is coupled to a second one horizontal interval delay element 26, the output of which is coupled to the input terminal I2 of switch 32. If the signal provided by delay element 24 corresponds to line N (FIG. 1C), then the signals applied to the inputs I1 and I2 of switch 32 correspond to lines N+1 and N−1 respectively.

Signal representing line N from delay element 24 is coupled to the minuend input terminal of subtracter 28 and output signal from switch 32 is coupled to the subtrahend input terminal of subtracter 28. Switch 32 is conditioned to couple alternate samples from line N+1 and N−1 to subtracter 28, e.g., the sequence of samples s, b, u, d, w. The chrominance component of the samples are constructively combined in the subtracter 28 to produce a comb filtered chrominance signal. If the input signal includes a luminance component it is substantially cancelled by the subtractive function. Output signal provided by subtracter 28 is coupled to a bandpass filter 30 designed to have a passband encompassing the frequency spectrum normally occupied by the chrominance signal. If the input video signal includes a luminance component, a separated luminance signal is provided by subtracting the bandpass and comb filtered signal from element 30, from delayed composite video signal from delay element 24 in the subtracter 34.

Delay element 26 provides samples representing line N−1 when comb filtered signal representing line N is being provided by subtracter 28 (and 34). With reference to FIG. 1C it is seen that only every other sample from line N−1 is utilized. Therefore delay element 26 may be realized with a half-H delay line, e.g., a memory element having half the storage capacity as delay element 24 and cycled or clocked at one-half the sample rate.

Figure 3:
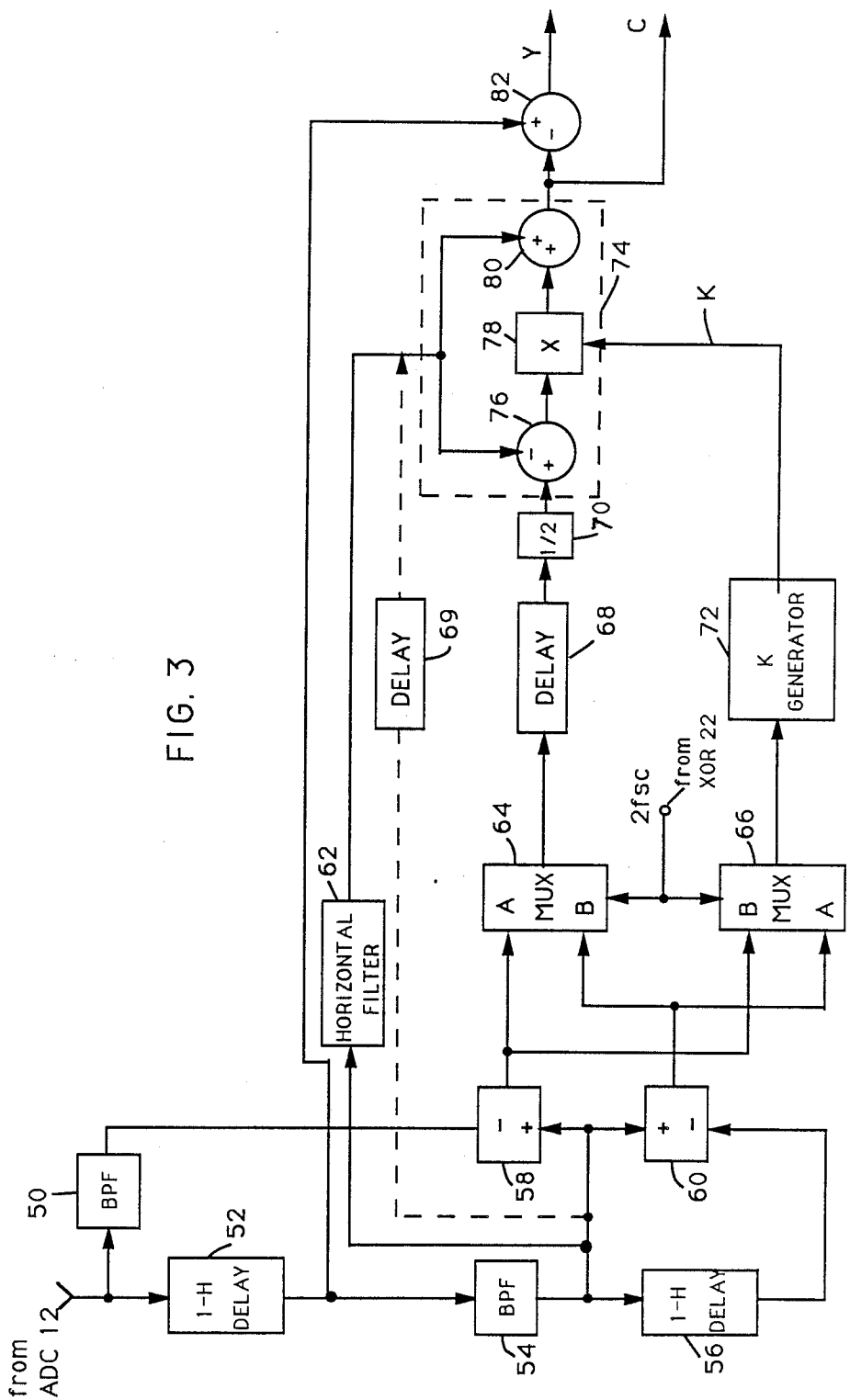

FIG. 3 illustrates an adaptive comb filter of the type shown in FIG. 2, including additional circuitry to compensate for comb filtered signal artifacts introduced by vertical transitions of the video signal. In FIG. 3, signal from ADC 12 is coupled to a one-horizontal-interval-delay element 52 and a bandpass filter 50. Output signal from delay element 52 is coupled via a bandpass filter 54 to a second one-horizontal-interval delay element 56. Bandpass filters 50 and 54 have passbands arranged to encompass the frequency spectrum normally occupied by the chrominance component of the input video signal.

Output signal from bandpass filter 54 is coupled to the minuend input connections of subtracter circuits 58 and 60. Output signals from delay element 56 and bandpass filter 50 are respectively coupled to the subtrahend input connections of subtracter circuits 60 and 58. The three signals coupled to subtracters 58 and 60 are all bandpass filtered. If the signal coupled to the minuend input connection of subtracter circuits 58 and 60 corresponds to line N (FIG. 1C) then the signals coupled to the subtrahend input connections of subtracters 58 and 60 respectively correspond to lines N+1 and N−1.

Subtracter 58 produces samples corresponding to the differences between successive vertically adjacent samples from lines N and N+1. Subtracter 60 produces samples corresponding to the differences between successive vertically adjacent samples from lines N and N−1. The difference samples from subtracter circuits 58 and 60 are coupled to respective signal input terminals of a two-to-one multiplexer 64. Multiplexer 64 is conditioned by the two-times $f_{sc}$ signal from exclusive OR circuit 22 (FIG. 2) to alternately couple samples from subtracter circuits 58 and 60 to a delay element 68. The sequence of samples provided by multiplexer 64 corresponds to the sequence of samples provided by subtracter circuit 28 in FIG. 2 and thus represents a comb filtered chrominance component corresponding to line N.

Delay element 68 provides a compensating delay to the comb filtered chrominance signal, to accommodate for processing delays in the remainder of the circuitry to be described. The comb filtered chrominance signal, since it is the algebric sum of two signals is of twice amplitude. Therefore the comb filtered signal from delay element 68 is coupled to an attenuator 70 which divides the signal amplitude by two. The divided signal from attenuator 70 is applied to one input terminal of a switching circuit 74. An alternative chrominance signal is coupled to a second input terminal of switching circuit 74. The alternative chrominance signal may be derived by horizontally filtering signal provided by bandpass filter 54 in filter 62. In this instance, horizontal filter 62 may provide narrowband chrominance signal samples corresponding to the comb filtered pixel available from attenuator 70. An exemplary horizontal filter function H is represented by the equation:

$$H = -1 + 2Z^{-p} - Z^{-2p}$$

where Z is the conventional Zee transform variable and the superscript p represents a one sample delay period. Alternatively, the alternative chrominance signal may simply be the bandpass filtered signal available from filter 54, coupled to the switching circuit 74 via compensating delay element 69. For example, if the comb filtered signal corresponds to combined samples n−u (for line N), the alternative chrominance sample corresponds to sample n (FIG. 1C). It will be appreciated by those skilled in the art of video signal processing, that other alternate chrominance signals may be derived from the input video signal and applied to switching circuit 74.

Switching circuit 74 is conditioned by a switching signal K to couple either the comb filtered chrominance signal or the alternative chrominance signal or a combination of both to its output terminal to provide a chrominance component signal. The chrominance component signal from circuit 74 may be subtracted (in subtracter circuit 82) from delayed composite video signal from delay element 52 to produce a luminance component signal.

The exemplary switching circuit 74 includes the cascade connection of a subtracter 76, a multiplier 78 and an adder 80. The comb filtered chrominance signal from attenuator 70 is coupled to one input of the subtracter 76. The alternative chrominance signal is coupled to a second input of subtracter 76 and to the adder 80. The control signal K nominally having values between 0–1 inclusive, is applied to the control input of the multiplier. The output produced by circuit 74 corresponds to (K)S1+(1−K)S2 where S1 and S2 correspond to the comb filtered and alternative chrominance signals respectively.

The control signal K is developed as follows. Refer to FIG. 1C and consider a comb filtered signal corresponding to sample n line N. The comb filtered sample representing pixel n is a combination of samples n and u. If a vertical transition exists between lines N and N+1 there is a high probability that the combined sample will be erroneous, i.e., introduce an artifact in the displayed image. If a transition exists at pixel n between lines N and N+1, it is highly probable that the transition extends to the area between pixels m and t and pixels o and v. The existence of such transitions can therefore be detected by measuring the difference between like phase samples m,t and o,v. These samples are not utilized in developing the comb filtered sample representing pixel n, but are utilized in determining if the comb filtered sample may be erroneous.

Referring again to FIG. 3, sample differences from subtracter circuits 58 and 60 are coupled to respective signal input terminals of a further multiplexer 66. Multiplexer 66 is conditioned by the two-times $f_{sc}$ clock signal from exclusive OR circuit 22 to provide a sequence of sample differences representing the alternate sample differences not passed by multiplexer 64. That is when comb filtered samples are developed representing line N, the sequence of sample differences passed by multiplexer 66 are derived from samples (l,a)(m,t)(n,c)(o,v) and (p,c). The samples provided by multiplexer 66 are coupled to the K control signal generator 72 which develops a K control signal representing the relative goodness of the current comb filtered signal. For example, if a vertical transition is detected or not detected, generator 72 may produce control values of zero and one respectively.

Figure 4:
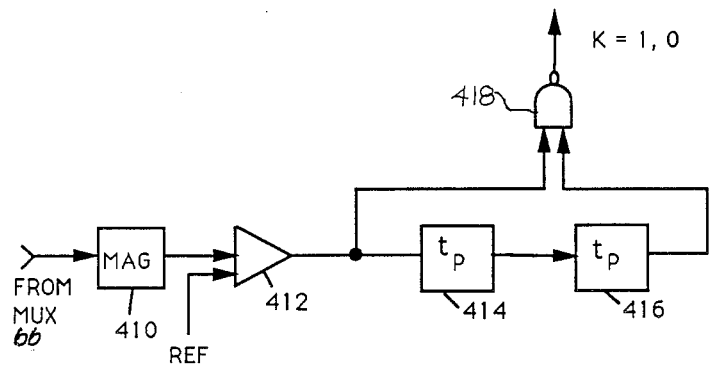
FIGS. 4–8 are block diagrams or schematics of alternative circuits which may be implemented for element 72 of FIG. 3.

FIG. 4 is a circuit diagram for a control signal generator 72 which develops K control signals having one and zero values. In this circuitry, the difference samples from multiplexer 66 are coupled to circuit element 410 which provides the magnitude of the difference samples. The magnitude samples are compared to a reference value REF in a comparator 412 which provides logic one and zero values for the magnitude samples being greater and lesser than the reference value respectively. The reference value is selected to be at least equal to the nominal expected noise value to preclude false detection of transitions. The reference value may be increased to a value representing vertical transitions which do not produce unacceptable comb filtered signals, which value will be determined subjectively for each particular video signal processing system.

The one/zero values from comparator 412 are coupled to one input terminal of a NAND gate 418, and to the input terminal of the cascade connected delay elements 414 and 416. The output of delay element 416 is coupled to a second input of the NAND gate 418. The delay elements 414 and 416 each provide a sample delay of one sample period. If the comb filtered sample currently provided by attenuator 70 corresponds to the difference between samples (n,u) then the one/zero values at the input to delay element 414 and output of delay element 416 correspond to differences between samples (o,v) and (m,t) respectively. If a logic "one" is present at both inputs to the NAND gate 418, NAND gate 418 provides a zero value and the alternate chrominance sample is provided by switching circuit 74. Otherwise, NAND gate 418 provides a "one" value and the comb filtered signal is provided by circuit 74.

Figure 6:
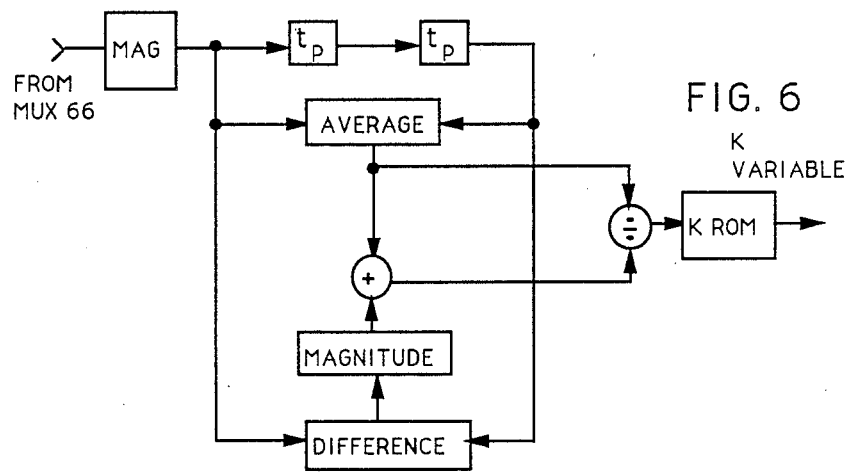
Figure 7:
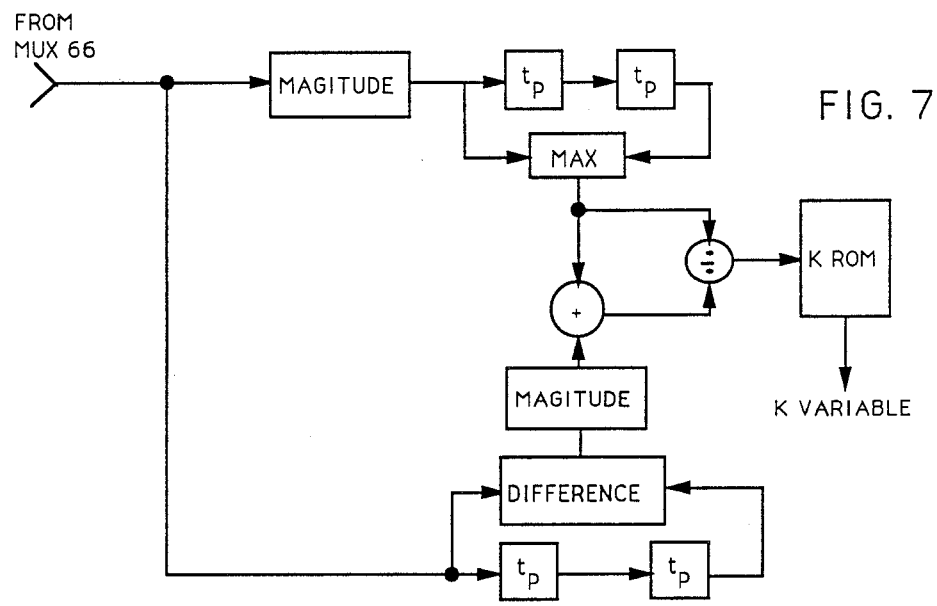
Figure 8:
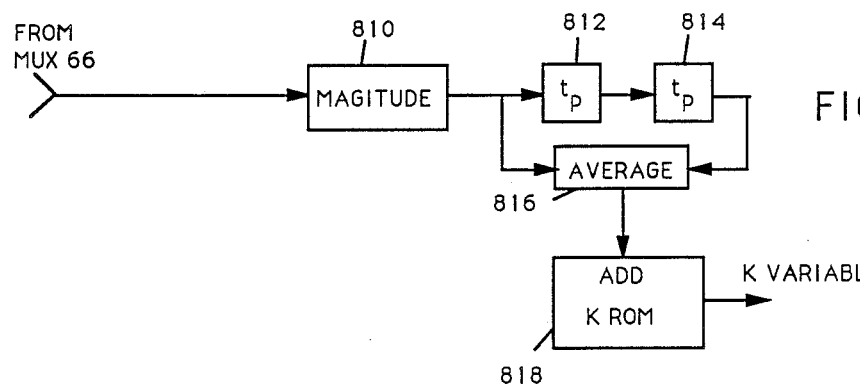

FIGS. 5-8 show alternative embodiments of the K signal generator 72, each of which provides a variable control signal, K, having values from zero to one. Refer first to FIG. 8. In this embodiment, sample differences from multiplexer 66 are coupled to a magnitude circuit 810 which provides the magnitudes of the differences. The magnitude values are coupled to cascade connected delay elements 812 and 814 and to one input connection of a sample averaging circuit 816. The output of delay element 814 is coupled to a second input connection of the averaging circuit 816 which provides the average of samples applied to its input connections e.g., the average of the magnitudes of the differences of samples (m,t) and (o,u). The averages provided by circuit 816 are applied to logic circuitry 818 which produces the K control signal. Logic circuitry 818 may conveniently be realized with a memory device, for example, a read only memory (ROM). The average values are coupled as address codes to the ROM which is programmed to produce K values associated with the average values. For example the ROM may be programmed to provide the reciprocal of the average values. Alternatively, the ROM may be programmed to produce a limited number of K values associated with predetermined ranges of the average values. For example, if the average values are represented by seven bit samples having values from zero to 127 the ROM may be programmed to provide K values corresponding to 1, ⅞, 6/8, ⅝, ⅜, 2/8, ⅛ and 0 for ranges of average values of (0-15), (16-31), (32-47), (48-63), (64-79), (80-95), (96-111) and (112-127) respectively.

Figure 5:
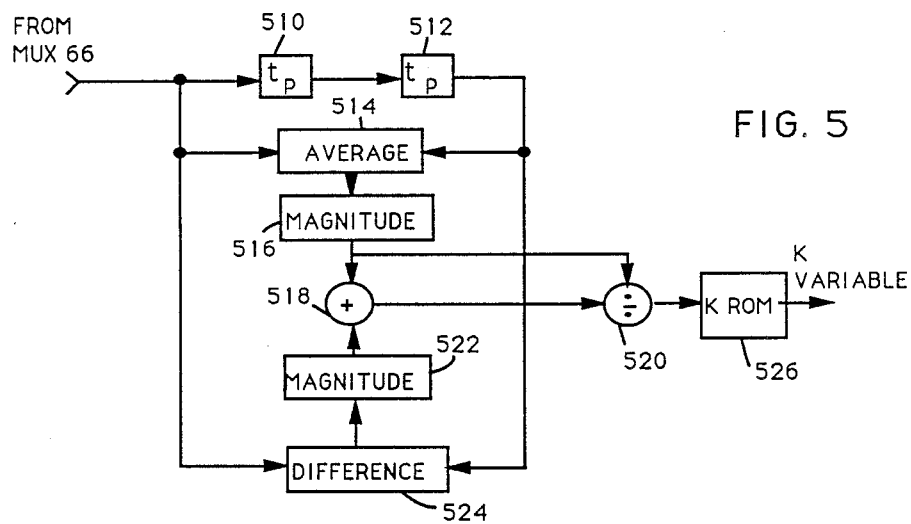

FIGS. 5, 6 and 7 are alternative circuits which provide K values related to the ratio of horizontal differences $H_o$ to vertical differences $V_D$ of the form $V_C/(F_D+H_D)$. The values provided by multiplexer 66 are vertical differences. Horizontal differences are derived, for example, by taking the differences between vertical differences.

The FIG. 5 circuit will be described in detail. The operation of the FIGS. 6 and 7 circuitry is similar and will be readily understood with knowledge of operation of the FIG. 5 circuit.

In FIG. 5, the difference samples from multiplexer 66 and coupled to the cascade connected one-sample-interval delay elements 510 and 512, to a signal averager 514 and a signal differencing circuit 524. Output samples from the delay element 512 are coupled to respective second input connections of the signal averager 514 and the signal differencing circuit 524. Averager 514 provides the average value, $V_D$, of two difference samples (e.g., (n−t) and (o−v)) and differencing circuit 524 provides the difference, $H_D$, between the same two difference samples. The average values $V_D$ are applied to a magnitude detector 516 which provides the absolute value $|V_D|$ of the average value. The differences $H_D$ provided by the differencing circuit 524 are coupled to a magnitude detector 522 which provides the absolute value $|H_D|$ of the difference values. The values $|V_D|$ and $|V_D|$ are summed in adder circuit 518 to form the signal $|H_D| + |V_D|$. The value $|V_D|$ detector 516 is then divided by the value $|H_D| + |V_D|$ in divider 520, producing the signal sample $|V_D|/(|H_D| + |V_D|)$ which is constrained to have values between zero and one inclusive. The signal samples from the divider 520 are coupled as address codes to a ROM 526 which is programmed to provide the appropriate K value for respective address values. Note that the FIG. 5 circuitry may be slightly rearranged to have the divider 520 produce the ratios $|H_D|/(|H_D| + |V_D|)$. In this instance the ROM 526 will be appropriately programmed to accommodate these address values. Note also that in either instance the function of the ROM 526 may be provided with alternative logic circuitry.

Figure 9:
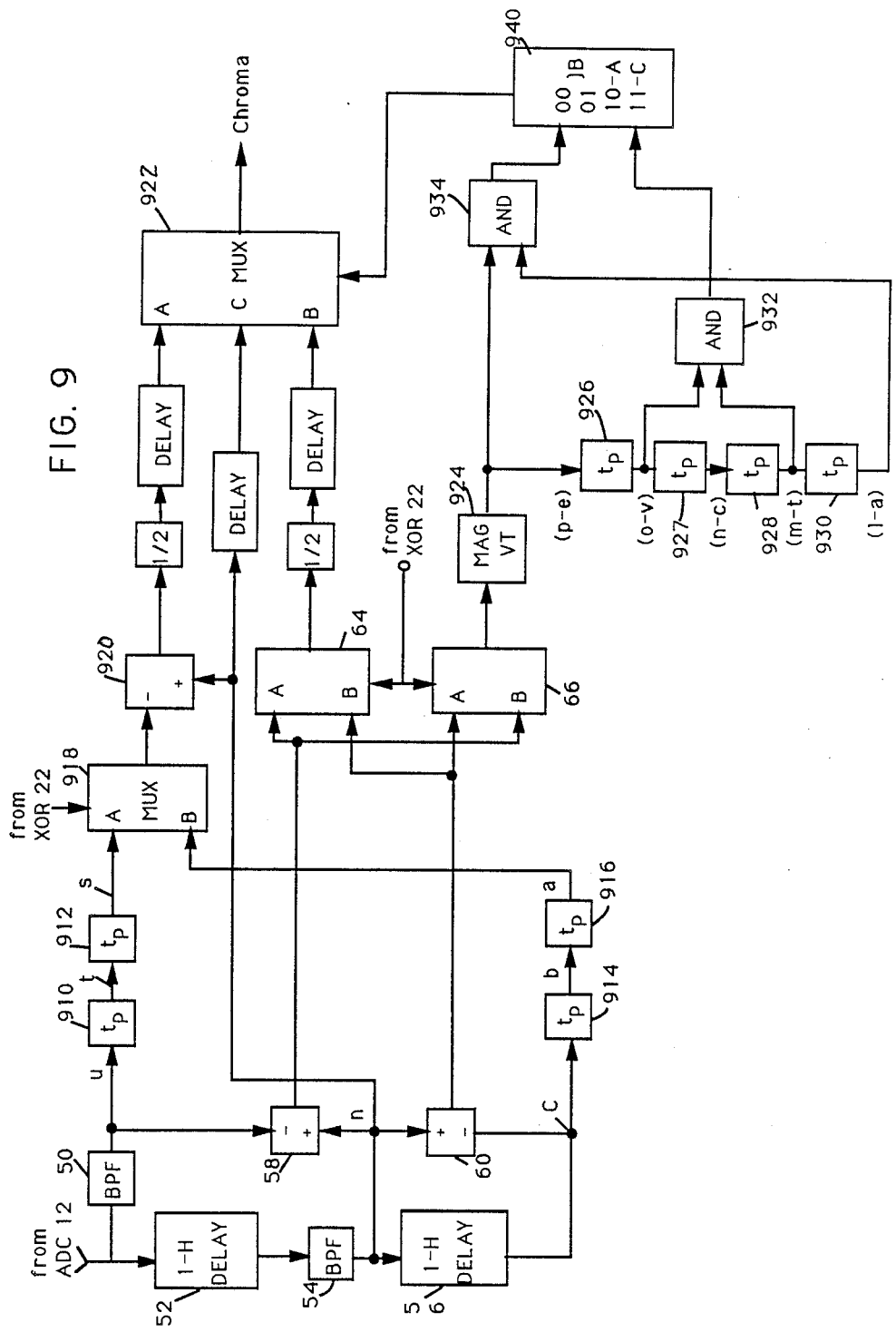

FIG. 9 is an alternative adaptive comb filter circuit which switches between line alternating comb filtered output and various other substitute signals. The comb filtered chrominance signal produced by the FIG. 2 circuitry is an example of line alternating comb filtered signal. In FIG. 9, circuit elements designated by like numerals as elements in FIG. 3 are similar and perform like functions. As such, multiplexer 64 produces a line alternating comb filtered chrominance signal and multiplexer 66 produces a sequence of line difference samples, which difference samples do not contribute to the comb filtered signal per se.

Refer to FIG. 1C and consider a comb filtered signal representing line N pixel n. A line alternating comb filter combines samples n and u. If there is a vertical transition between lines N and N+1, the comb filtered sample will probably be in error. If a vertical transition exists between lines N and N+1, it is highly unlikely that a vertical transition will concurrently occur between lines N and N−1. Therefore, it may be more advantageous to combine sample n with a sample from line N−1, for example sample a or sample e or an average of both. Note samples a and e are sampled at the same subcarrier phase as sample u. The circuitry of FIG. 9 is arranged to substitute a comb filtered sample, e.g., n—a, or sample n for the line alternating comb filtered sample e.g., n—u, if a probable error exists in the line alternating comb filtered sample.

In FIG. 9, signal from the bandpass filter 50 is coupled to delay elements 910 and 912 to concurrently provide samples u, + and s (FIG. 1C). Signal from delay element 56 is coupled to delay elements 914 and 916 to concurrently provide samples b and a (FIG. 1C). The delay elements 912 and 916 are coupled to respective input terminals of a multiplexer 918 which is conditioned by the two times $f_{sc}$ signal from exclusive OR circuit 22 to pass a sample from line N−1 when the multiplexer 64 is passing a sample representing the difference between lines N and N+1 and vice versa. The output of multiplexer 918 is coupled to the subtrahend input of subtracter 920. The minuend input of the subtracter 920 is coupled to the output of the bandpass filter 54. The subtracter 920 provides the difference e.g., n—a concurrently with multiplexer 64 providing the difference n—u. Output samples from the subtracter 920, multiplexer 64 and bandpass filter 54 are coupled to respective signal input terminals A, B and C of a multiplexer 922. Multiplexer 922 is conditioned by a control circuit 940 to pass one of the signals available at its A, B and C input connections as a chrominance signal CHROMA. The chrominance signal may thereafter be combined with composite video signal to produce a luminance component as in FIG. 3. Note, compensating delays are provided in each of the input signal paths to the multiplexer 922 to accommodate the processing delay of the multiplexer 922 control signal generating circuitry.

Control signals for the multiplexer 922 are developed from the alternate difference samples provided by multiplexer 66. In the exemplary circuitry shown, sample differences from multiplexer 66 are coupled to circuitry 924 which provides logic one values for difference samples having a magnitude which exceed a predetermined threshold value and provides logic zero values otherwise. The logic one/zero values are coupled to the cascade connected delay elements 926–930. Assuming that the current signals available at multiplexer 922 correspond to line N sample n, the one/zero values representing the alternate difference samples from multiplexer 66 are indicated adjacent the output connections of delay elements 926–930. The one/zero values from delay elements 926 and 928, representing difference values disposed on either side of the current line alternating comb filter sample, are applied to respective input connections of an AND gate 932. AND gate 932 provides a logic one output value only when both of its input values are a logic 1 and provides a logic zero value otherwise. If AND gate 932 provides a logic one value it is probable that the line alternating comb filtered sample from multiplexer 64 is in error.

The one/zero values from circuit 924 and delay element 930 are coupled to respective input connections of an AND gate 934. The values coupled to AND gate 934 represent differences disposed on either side of the current line alternating comb filter sample removed two sample intervals from the current sample and derived from the current line (N) and the adjacent line (N−1) which is not contributing to the current line alternating comb filter sample. AND gate 934 provides a logic one output value when a vertical transition exists between the current line and the adjacent line not contributing to the current line alternating comb filter sample.

The output logic value from AND gates 932 and 934 are applied to the control logic circuitry 940 which generates control signals for multiplexer 922. If AND gate 932 provides a logic 0 value, control circuit 940 conditions multiplexer 922 to pass the sample available from multiplexer 64. If both of the AND gates 932 and 934 provide logic one values, indicating transitions between the current line and both adjacent lines, control circuitry 940 conditions multiplexer 922 to pass the sample available from the bandpass filter 54. Finally, if AND gate 932 provides a logic one and AND gate 934 provides a logic zero, indicating a vertical transition between e.g., lines N and N+1 but no transition between lines N and N−1, then control circuit 940 conditions the multiplexer 922 to pass the alternate difference sample (e.g., n—a) provided by subtracter 926.

The circuitry of FIG. 9 can be slightly rearranged to generate a further substitute signal (alternative to the sample n—a). Consider the comb filtered sample (n—u) representing line N sample n. The sample c, immediately above sample n is of like sampling phase. Both samples n and c have been derived via bandpass filter 54 and thus are primarily chrominance samples. Thus if the samples n and c are additively combined the sum thereof will be primarily a chrominance sample. These substitute samples may be produced in the FIG. 9 arrangement by substituting an adder circuit for subtracter 926 and coupling the A and B input connections of multiplexer 918 to the output connections of delay element 56 and bandpass filter 50 respectively (i.e., eliminating delay elements 910–916). The remainder of the circuitry of FIG. 9 can remain intact. The substitute samples, e.g., (n+c), have the advantage of being derived from spatially adjacent samples, but the disadvantage of including high frequency luminance. Conversely the substitute samples, e.g., (n—a), contain substantially no luminance components but are derived from fairly widely separated samples and may include errors due to horizontal transitions.

Both alternatives of the FIG. 9 circuitry may be combined in a single system with appropriate detection circuitry to select the substitute sample least likely to introduce artifacts in the reproduced image.

While the description provided hereby with reference to the circuitry illustrated in FIGS. 2–9, has been primarily in terms of PAL video samples, it will be appreciated by those skilled in the art of video signal processing, that the concepts are equally applicable to NTSC video signals, and the claims should be considered in this light.

What is claimed is:

1. Comb filter apparatus comprising:
   a signal input terminal for providing an input video signal;
   means coupled to said signal input terminal for concurrently providing video signals from three successive horizontal lines designated top, middle and bottom;
   means including combining means responsive to said video signals from said top, middle and bottom lines for providing a comb filtered signal representing said middle line, said comb filtered signal including said video signal from said middle line alternately combined at regular intervals less than a line interval, with said video signals from said top and bottom lines.

2. The comb filter apparatus set forth in claim 1 wherein said input video signal includes a chrominance component having a carrier of frequency $f_c$ modulated with chrominance information and said means including combining means alternately combines said video signal from said middle lines with said video signals from said top and bottom lines at a rate which is a multiple of said frequency $f_c$.

3. The comb filter apparatus set forth in claim 1 wherein said means including combining means includes means for providing a further signal including said video signal from said middle line combined with said video signals from said top and bottom lines exclusive of segments of said video signals from said top and bottom lines which contribute to said comb filtered signal;
   substitute signal generating means coupled to said signal input terminal, for providing a substitute video signal; and
   means responsive to said further signal for determining probable occurrences in signal errors in said comb filtered signal and substituting said substitute video signal therefor.

4. Comb filter apparatus for comb filtering video signal including a carrier signal of frequency $f_c$ quadrature modulated along first and second axes by first and second chrominance components (I,Q or UV), said apparatus comprising:
   a signal input terminal for receiving said video signal;
   sampling means coupled to said signal input terminal for sampling said video signal at a rate equal to a multiple of said carrier signal frequency and at intervals disposed substantially 45 degrees relative to said first and second axes, to produce video signal samples;
   means coupled to said sampling means for concurrently providing said video signal samples from three successive horizontal lines of said video signal designated top, middle and bottom;
   means including combining means for providing a line alternating comb filtered video signal including said video signal samples from said middle line alternately combined with said video signal samples from said top and bottom lines.

5. The comb filter apparatus set forth in claim 4 wherein said means including combining means also provides a sequence of samples representing differences between said video signal samples from said middle line and alternate samples from said top and bottom lines located between said video signal samples contributing to said line alternating comb filtered video signal;
   means coupled to said signal input terminal for generating a substitute video signal;
   means responsive to said sequence of samples for determining probably occurrences of errors in said line alternating comb filtered video signal and substituting said substitute video signal therefor.

6. The comb filter apparatus set forth in claim 4 wherein said video signal conforms to PAL standards and said comb filter apparatus further includes:
   means coupled to said signal input terminal for generating a PAL switch signal having first and second states indicating the relative phase of one of said chrominance components; and
   wherein said means including combining means is responsive to said PAL switch signal for determining which video signal samples from said top and bottom lines are combined with video signal samples from said middle line.

7. The comb filter apparatus set forth in claim 6 wherein said means including combining means also provides a sequence of samples representing differences between said video signal samples from said middle line and alternate samples from said top and bottom lines located between said video signal samples contributing to said line alternating comb filtered video signal;
   means coupled to said signal input terminal for generating a substitute video signal;
   means responsive to said sequence of samples for determining probably occurrences of errors in said line alternating comb filtered video signal and substituting said substitute video signal therefor.

8. The comb filter apparatus set forth in claim 6 wherein said means including combining means comprises:
   first and second subtracter circuits having respective minuend input terminals coupled to receive said video signal samples from said middle line, having respective subtrahend input terminals coupled to receive said video signal samples from said bottom and top lines respectively, and having respective output terminals;
   a first multiplexer having first and second input terminals coupled to the output terminals of said first and second subtracter circuits, having a control input terminal and an output terminal for providing said line alternating comb filtered signal;
   a second multiplexer having second and first input terminals coupled to the output terminals of said first and second subtracter circuits, having a control input terminal and an output terminal for providinq said sequence of samples;
   means, coupled for receiving said PAL switch signal, for providing a control signal to the control input terminals of said first and second multiplexers, said control signal having a frequency equal to one half the sample rate and a relative phase determined by the state of the PAL switch signal.

9. The comb filter apparatus set forth in claim 5 wherein the means for determining probable occurrences of errors comprises:
   means responsive to said sequence of samples for providing a second sequence of samples having first and second states for the magnitude of the corresponding samples of said sequence being greater and lesser than a predetermined value; and
   means responsive to said second sequence of samples for generating a signal indicating a probable error when predetermined ones of said second sequence of samples concurrently exhibit a like one of said first and second states.

10. The comb filter apparatus set forth in claim 5 wherein said means for determining probable errors and substituting comprises:
    means, coupled for receiving said line alternating comb filtered video signal and said substitute video signal, and responsive to a control signal for proportionally combining said line alternating comb filtered and substitute video signals;
    means, coupled for receiving said sequence of samples, for developing a first value representing a vertical transition between lines from which samples for the current comb filtered sample is derived;
    means, coupled for receiving said sequence of samples, for developing a second value representing a horizontal transition occurring proximate the sample for which the current comb filtered sample is produced; and means, coupled for receiving said first and second values, for providing said control signal representing the ratio of one of said first and second values divided by the sum of said first and second values; and means for coupling said control signal to said means for proportionally combining.

11. The comb filter apparatus set forth in claim 5 wherein the means for determining probably errors and substituting comprises:

means, coupled for receiving said line alternating comb filtered video signal and said substitute video signal, and responsive to a control signal for proportionally combining said comb filtered and substitute video signals;

means, coupled for receiving said sequence of samples, for generating said control signal as a function of the magnitude of samples of said sequence representing differences between the middle and top lines relative to the magnitude of samples of said sequence representing differences between the middle and bottom lines.

* * * * *